United States Patent
Blair et al.

(10) Patent No.: US 10,047,631 B2
(45) Date of Patent: Aug. 14, 2018

(54) TURBINE ENGINE COOLING SYSTEM WITH AN OPEN LOOP CIRCUIT

(71) Applicant: United Technologies Corporation, Farmington, CT (US)

(72) Inventors: Michael F. Blair, Manchester, CT (US); Tracy A. Propheter-Hinckley, Manchester, CT (US); Mark F. Zelesky, Bolton, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/651,194

(22) Filed: Jul. 17, 2017

(65) Prior Publication Data

US 2017/0314415 A1  Nov. 2, 2017

Related U.S. Application Data

(62) Division of application No. 13/679,670, filed on Nov. 16, 2012, now Pat. No. 9,739,171.

(51) Int. Cl.

| F04D 29/38 | (2006.01) |
|---|---|
| F01D 25/12 | (2006.01) |
| F28F 1/12 | (2006.01) |
| F28D 15/00 | (2006.01) |
| F28F 7/02 | (2006.01) |
| F02C 7/14 | (2006.01) |
| F01D 25/10 | (2006.01) |
| F28F 1/40 | (2006.01) |

(52) U.S. Cl.
CPC .............. *F01D 25/12* (2013.01); *F01D 25/10* (2013.01); *F02C 7/14* (2013.01); *F28D 15/00* (2013.01); *F28F 1/124* (2013.01); *F28F 1/40* (2013.01); *F28F 7/02* (2013.01); *F05D 2260/205* (2013.01); *F05D 2260/213* (2013.01); *F05D 2260/232* (2013.01); *F28F 2255/18* (2013.01); *Y02T 50/676* (2013.01)

(58) Field of Classification Search
CPC ............... F01D 25/12; F05D 2260/213; F05D 2260/53; F05D 2260/98; F04D 29/5806; F04D 29/5866
USPC ........................................................ 415/177
See application file for complete search history.

(56) References Cited

U.S. PATENT DOCUMENTS

| 3,822,561 A * | 7/1974 | Miller ....................... F24F 1/02 |
| | | 62/139 |
| 4,474,001 A | 10/1984 | Griffin |
| 4,696,156 A | 9/1987 | Burr et al. |
| 5,544,700 A | 8/1996 | Shagoury |
| 5,697,208 A | 12/1997 | Glezer |

(Continued)

OTHER PUBLICATIONS

A. Simchi, "Direct Laser Sintering of Metal Powders: Mechanism, Kinetics and Microstructural Features", Materials Science and Engineering, vol. 428, pp. 148-158, 2006.

*Primary Examiner* — Jason Shanske
*Assistant Examiner* — Jason Mikus
(74) *Attorney, Agent, or Firm* — O'Shea Getz P.C.

(57) ABSTRACT

A turbine engine system includes a heat source, a heat exchanger, a cooling medium inlet and a cooling medium outlet. The heat source includes a first passage. The heat exchanger includes a second passage and a third passage. The first and the second passages are configured in a closed loop circuit. The third passage is configured between the inlet and the outlet in an open loop circuit.

12 Claims, 9 Drawing Sheets

(56) References Cited

U.S. PATENT DOCUMENTS

| | | | |
|---|---|---|---|
| 5,735,676 A | * | 4/1998 | Loos ................ F01D 25/18 |
| | | | 184/104.1 |
| 6,282,881 B1 | | 9/2001 | Beutin |
| 6,869,324 B2 | | 3/2005 | Matsuda |
| 7,766,615 B2 | | 8/2010 | Spangler et al. |
| 7,837,441 B2 | | 11/2010 | Spangler et al. |
| 8,066,052 B2 | | 11/2011 | Blair |
| 8,092,151 B2 | | 1/2012 | Becker |
| 8,100,633 B2 | | 1/2012 | Propheter-Hinckley et al. |
| 8,105,030 B2 | | 1/2012 | Abdel-Messeh et al. |
| 8,257,024 B1 | | 9/2012 | Phillips et al. |
| 2005/0155353 A1 | | 7/2005 | Sabatino et al. |
| 2007/0039305 A1 | | 2/2007 | Taha et al. |
| 2009/0121367 A1 | | 5/2009 | Lundgreen et al. |
| 2009/0313999 A1 | | 12/2009 | Hunter et al. |
| 2011/0272122 A1 | | 11/2011 | Corbeil et al. |
| 2012/0144843 A1 | | 6/2012 | Donovan |
| 2012/0152501 A1 | | 6/2012 | Harvey et al. |
| 2012/0163975 A1 | | 6/2012 | Propheter-Hinckley et al. |
| 2012/0189424 A1 | | 7/2012 | Propheter-Hinckley |
| 2012/0243970 A1 | | 9/2012 | Hellgren et al. |

\* cited by examiner

TURBINE ENGINE COOLING SYSTEM WITH AN OPEN LOOP CIRCUIT

This patent application is a divisional of and claims priority to U.S. patent application Ser. No. 13/679,670 filed Nov. 16, 2012, which is hereby incorporated herein by reference in its entirety.

BACKGROUND OF THE INVENTION

1. Technical Field

This disclosure relates generally to a turbine engine and, more particularly, to a system for cooling a source within a turbine engine.

2. Background Information

A typical geared turbofan engine includes a gear train that connects a fan rotor to a low speed shaft. The gear train may generate a significant quantity of heat energy as a byproduct of turbine engine operation, particularly as the gear train beings to wear. This heat energy may be removed from the gear train and the engine utilizing a cooling system. Such a cooling system may include a heat exchanger that is configured in a closed loop circuit with a passage extending through the gear train. The heat exchanger may be arranged within the bypass duct of the engine.

To cool the gear train, at least a portion of the heat energy from the gear train is transferred into a cooling medium such as lubrication oil flowing through the passage. The heat exchanger subsequently transfers at least a portion of the heat energy from the cooling medium into air flowing through the bypass duct. However, at relatively low altitudes and/or in certain environments, the air within the bypass duct may be relatively warm. The effectiveness of the cooling system therefore may be reduced when an aircraft is at such low altitudes for an extended period of time; e.g., while waiting on a runway or in a holding pattern in a relatively warm environment.

There is a need in the art for an improved cooling system for a turbine engine.

SUMMARY OF THE DISCLOSURE

According to an aspect of the invention, a turbine engine system is provided that includes a turbine engine heat source, a heat exchanger, a cooling medium inlet and a cooling medium outlet. The heat source includes a first passage. The heat exchanger includes a second passage and a third passage. The first and the second passages are configured in a closed loop circuit. The third passage is configured between the cooling medium inlet and outlet in an open loop circuit.

According to another aspect of the invention, a turbine engine system is provided that includes a gear train that connects a rotor to a shaft, and a plurality of heat exchange systems. A first of the heat exchange systems transfers heat energy from the gear train to a second of the heat exchange systems. The first heat exchange system is configured in a closed loop circuit, and the second heat exchange system is configured in an open loop circuit.

The turbine engine system may include a case and a heat exchanger. The case houses the gear train, and includes a first passage. The heat exchanger includes a second passage and a third passage. The first heat exchange system includes the first and the second passages, and the second heat exchange system includes the third passage.

The turbine engine system may include a rotor and a shaft. The heat source may include a gear train that connects the rotor to the shaft. The rotor may be a fan rotor or a compressor rotor. The shaft may be a low speed shaft.

The heat source may include a gear train. Alternatively or in addition, the heat source may include a bearing assembly, a seal assembly and/or any other device that generates heat energy as, for example, a byproduct of turbine engine operation.

The turbine engine system may include a cooling medium reservoir that is fluidly coupled to the cooling medium inlet and configured in the open loop circuit.

The turbine engine system may include a flow regulator that is fluidly coupled between the cooling medium inlet and the third passage.

The turbine engine system may include a flow regulator that is fluidly coupled between the third passage and the cooling medium outlet.

The turbine engine system may include a flow regulator that is fluidly coupled between the first and the second passages.

The turbine engine system may include a second heat exchanger with a fourth passage. The first passage may be fluidly coupled between an outlet of the second passage and an inlet of the fourth passage. The heat source may include a fifth passage that is fluidly coupled between an outlet of the fourth passage and an inlet of the second passage. The second heat exchanger may be or include a radiator.

The turbine engine system may include a second heat exchanger that includes a fourth passage. The fourth passage is configured with a fifth passage in a second closed loop circuit. The fifth passage may be included in the heat source. The second heat exchanger may be or include a radiator.

The turbine engine system may include a second heat exchanger with a fourth passage and a fifth passage. The fourth passage may be fluidly coupled between an outlet of the second passage and an inlet of the first passage. The fifth passage may be fluidly coupled between an outlet of the first passage and an inlet of the second passage.

The turbine engine system may include a cooling medium reservoir that is fluidly coupled between the fifth passage and the second passage and/or the fourth passage.

The turbine engine system may include a flow regulator fluidly coupled between the cooling medium reservoir and the fourth passage. The flow regulator may be configured parallel with respect to the second passage within the closed loop circuit.

The cooling medium reservoir may be or include a fuel tank or an oil (e.g., lubrication oil) tank.

At least portions of the second and the third passages may be arranged in a counter flow configuration.

At least portions of the second and the third passages may be arranged in a cross flow configuration.

At least portions of the second and the third passages may be arranged in a parallel flow configuration.

The turbine engine system may include a cooling medium reservoir that is configured in the open loop circuit. This cooling medium reservoir may be or include a water tank.

The turbine engine system may include a cooling medium reservoir that is configured in the closed loop circuit. This cooling medium reservoir may be or include a fuel tank or an oil (e.g., lubrication oil) tank.

The foregoing features and the operation of the invention will become more apparent in light of the following description and the accompanying drawings.

DETAILED DESCRIPTION OF THE INVENTION

A turbine engine includes various devices that generate heat energy as a byproduct of engine operation. These devices are referred to below generally as "turbine engine heat sources". Some examples of a turbine engine heat source include a gear train, a bearing assembly and a seal assembly. Several non-limiting examples of a cooling system for removing heat energy from at least one of the turbine engine heat sources are described below.

Figure 1:
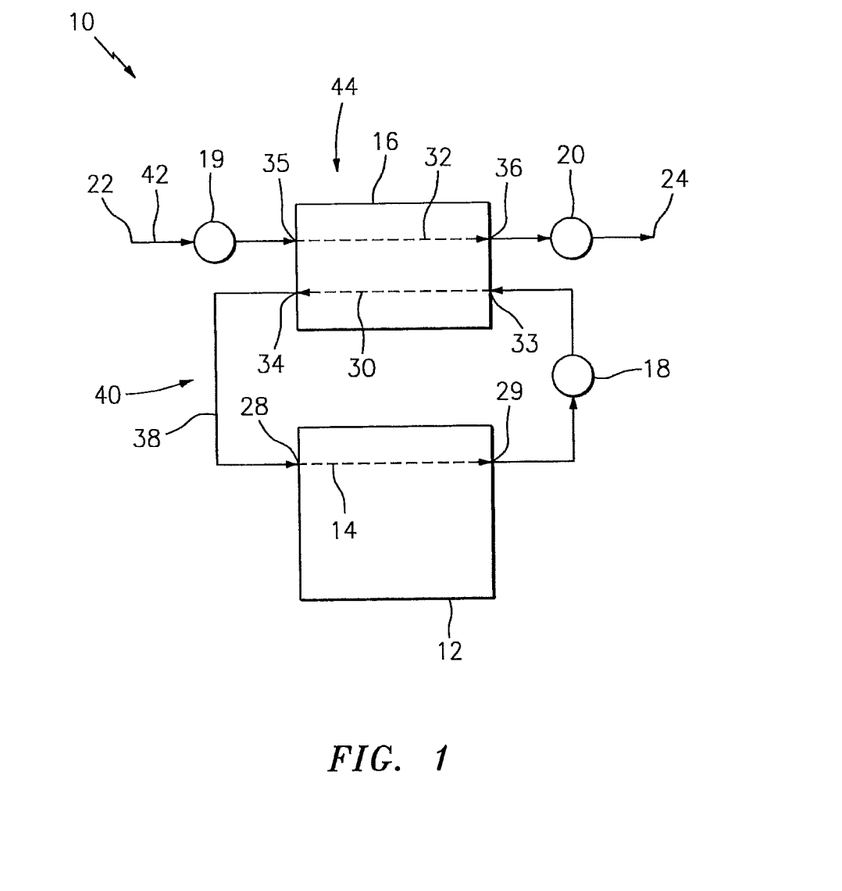
FIG. 1 is a schematic illustration of a cooling system for removing heat energy from a turbine engine heat source.

FIG. 1 is a schematic illustration of a cooling system 10 for removing heat energy from a turbine engine heat source 12 such as a gear train. The cooling system 10 includes a passage 14 arranged within the heat source 12, a heat exchanger 16, one or more flow regulators 18-20, a cooling medium inlet 22, and a cooling medium outlet 24.

The passage 14 extends through the heat source 12 between a passage inlet 28 and a passage outlet 29. The passage 14, for example, may extend through a case that houses one or more components of the heat source 12. The passage 14 may be &cued by one or more apertures, channels, gaps, chambers and/or other types of voids between components (e.g., gears, shafts, bearings, a case wall, etc.) of the heat source 12 (e.g., gear train).

The heat exchanger 16 includes a plurality of heat exchange passages 30 and 32. The first passage 30 extends through the heat exchanger 16 between a passage inlet 33 and a passage outlet 34. The second passage 32 extends through the heat exchanger 16 between a passage inlet 35 and a passage outlet 36. The heat exchanger 16 may be configured as a discrete unit. Alternatively, the heat exchanger 16 may be included as part of one or more other components of the turbine engine.

One or more of the flow regulators 18-20 are each adapted to control whether a cooling medium may flow within a respective portion of the cooling system 10. One or more of the flow regulators 18-20 may also or alternatively be adapted to control a flow rate at which the cooling medium flows within the respective portion of the cooling system 10. Each of the flow regulators 18-20 may include or be configured as one or more valves and/or a pump.

The cooling medium inlet 22 includes one or more discrete conduits (e.g., hoses). The cooling medium inlet 22 may also or alternatively include one or more passages extending through or define by one or more other components of the turbine engine.

The cooling medium outlet 24 includes one or more discrete conduits. The cooling medium outlet 24 may also or alternatively include one or more passages extending through or defined by one or more other components of the turbine engine.

The passages 14 and 30 and the flow regulator 18 are configured in a closed loop circuit 38, and form a first heat exchange system 40. The passage outlet 34 is fluidly coupled to the passage inlet 28. The flow regulator 18 is fluidly coupled inline between the passage outlet 29 and the passage inlet 33. The passage 32, the flow regulators 19 and 20, the cooling medium inlet 22 and the cooling medium outlet 24 are configured in an open loop circuit 42, and form a second heat exchange system 44. The flow regulator 19 is fluidly coupled inline between the cooling medium inlet 22 and the passage inlet 35. The flow regulator 20 is fluidly coupled inline between the passage outlet 36 and the cooling medium outlet 24.

The heat source 12, as set forth above, may generate heat energy during turbine engine operation. To remove this heat energy from the heat source 12, the flow regulator 18 permits a first cooling medium to circulate within the closed loop circuit 38. One or more of the flow regulators 19 and 20 also peimit a second cooling medium to flow through the open loop circuit 42. The first cooling medium may be fuel, lubrication oil or refrigerant. The second cooling medium may be fuel, pure or treated water or refrigerant. The cooling medium inlet 22 may receive the second cooling medium from a cooling medium reservoir (e.g., tank) or through a conduit that is fluidly coupled to a remote cooling medium source such as a well or municipal water supply. The cooling medium outlet 24 may exhaust the second cooling medium out of the turbine engine or into a gas path of the turbine engine.

The heat energy from the heat source 12 is transferred into the first cooling medium flowing through the passage 14. The heat exchanger 16 transfers the heat energy from the first cooling medium flowing through the passage 30 into the second cooling medium flowing through the passage 32. This transfer of heat energy may vaporize some or substantially all of the second cooling medium, or the second cooling medium may remain in a single (e.g., liquid) phase. The second cooling medium as well as the heat energy carried thereby is subsequently expelled from the cooling system 10 through the cooling medium outlet 24.

Figure 2:
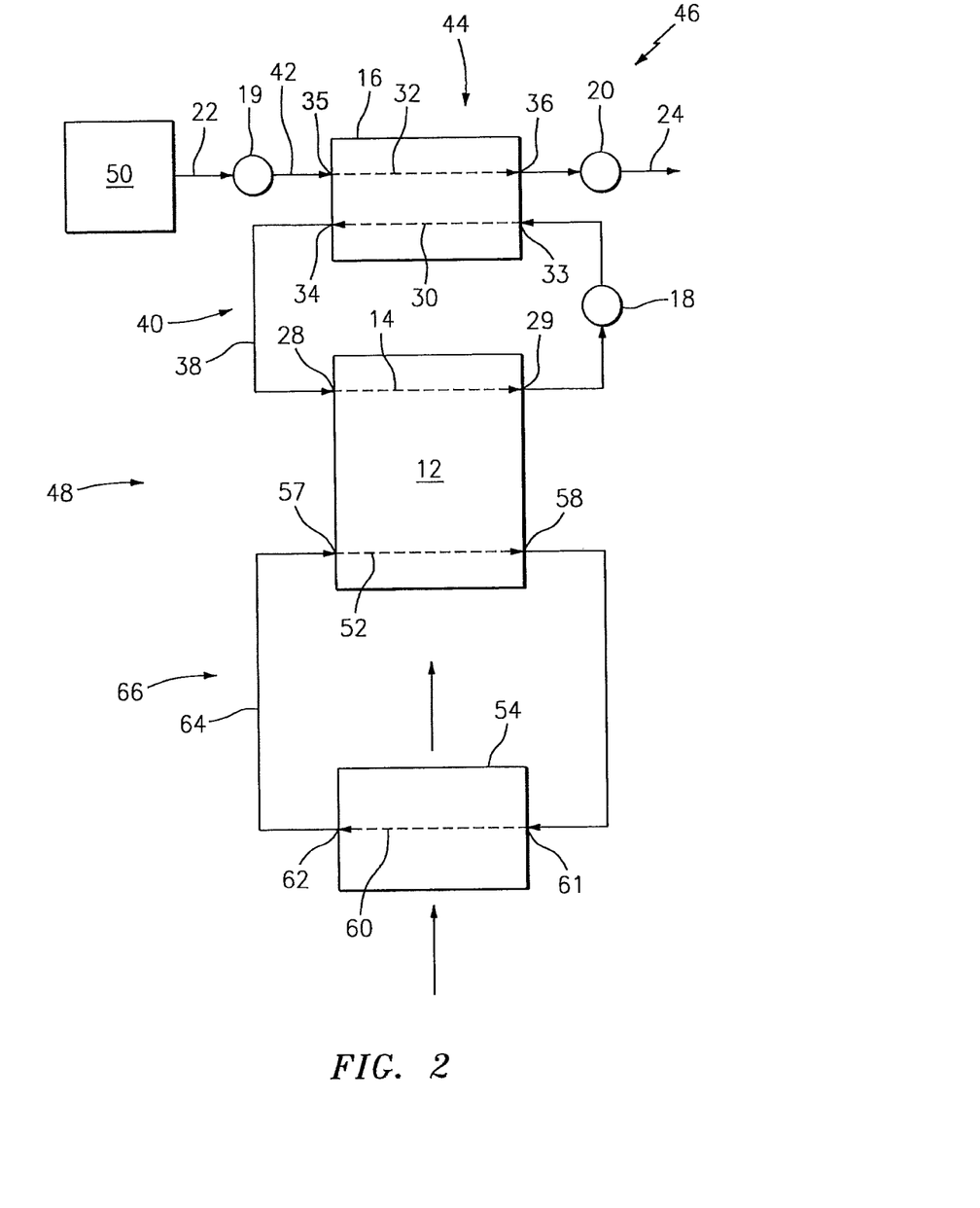
FIG. 2 is a schematic illustration of a turbine engine system that includes an alternative embodiment cooling system for removing heat energy from a turbine engine heat source.

FIG. 2 is a schematic illustration of a turbine engine system 46 that includes an alternate embodiment cooling system 48, the turbine engine heat source 12, and a cooling medium reservoir 50. In contrast the cooling system 10 of FIG. 1, the cooling system 48 also includes another passage 52 arranged within the heat source 12, and a second heat exchanger 54. The cooling system 48 may also include various other components (e.g., flow regulators, heat exchangers, etc.), which are not illustrated for ease of description.

The passage 52 extends through the heat source 12 between a passage inlet 57 and a passage outlet 58. The passage 52 may be formed by one or more apertures, channels, gaps, chambers and/or other types of voids between components (e.g., gears, shafts, bearings, a case wall, etc.) of the heat source 12 (e.g., gear train).

The second heat exchanger 54 is configured as a radiator (e.g., a liquid-to-air finned tube heat exchanger) with a heat exchange passage 60. The passage 60 extends through the second heat exchanger 54 between a passage inlet 61 and a passage outlet 62.

The passages 52 and 60 are configured in a second closed loop circuit 64, and form a third heat exchange system 66. The passage outlet 58 is fluidly coupled to the passage inlet 61. That passage outlet 62 is fluidly coupled to the passage inlet 57. The cooling medium reservoir 50 is fluidly coupled to the cooling medium inlet 22.

To remove heat energy from the heat source 12, the first and the second heat exchange systems 40 and 44 may be operated as described above. In addition or alternatively, a third cooling medium may be circulated within the second closed loop circuit 64. The third cooling medium may be fuel, lubrication oil or refrigerant. The heat energy from the heat source 12 is transferred into the third cooling medium flowing through the passage 52. The second heat exchanger 54 transfers the heat energy from the third cooling medium flowing through the passage 60 into air flowing through and/or around the second heat exchanger 54 (e.g., radiator).

Figure 3:
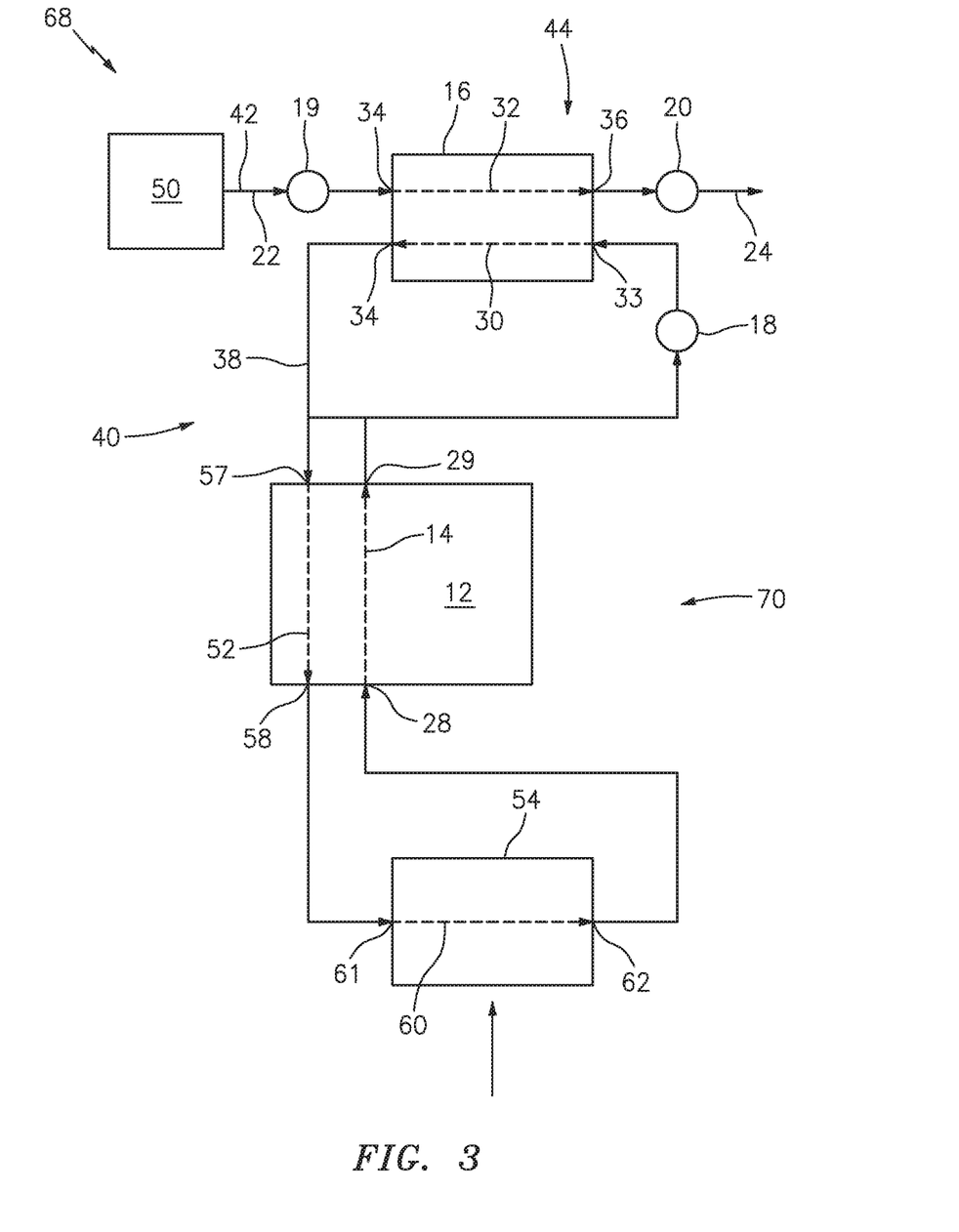
FIG. 3 is a schematic illustration of a turbine engine system that includes another alternative embodiment cooling system for removing heat energy from a turbine engine heat source.

FIG. 3 is a schematic illustration of another turbine engine system 68 that includes another alternate embodiment cooling system 70, the turbine engine heat source 12, and the cooling medium reservoir 50. In contrast the cooling system 48 of FIG. 2, the passages 30, 52, 60 and 14 and the flow regulator 18 of the cooling system 70 are configured in the closed loop circuit 38, and form the first heat exchange system 40. The passage outlet 34 is fluidly coupled to the passage inlet 57. The passage outlet 58 is fluidly coupled to the passage inlet 61. The passage outlet 62 is fluidly coupled to the passage inlet 28. The flow regulator 18 is fluidly coupled inline between the passage outlet 29 and the passage inlet 33. The passage outlet 29 may also be fluidly coupled to the passage inlet 57.

To remove heat energy from the heat source 12, the flow regulator 18 permits the first cooling medium to circulate within the closed loop circuit 38. The heat energy from the heat source 12 is transferred into the first cooling medium flowing through the passages 14 and 52. The second heat exchanger 54 transfers the heat energy from the first cooling medium flowing through the passage 60 into air flowing through and/or around the second heat exchanger 54 (e.g., radiator). The heat exchanger 16 may also be operated as described above to transfer additional heat energy from the first cooling medium into the second cooling medium. Alternatively, the flow regulator 18 may substantially prevent the first cooling medium from flowing through the passage 30.

Figure 4:
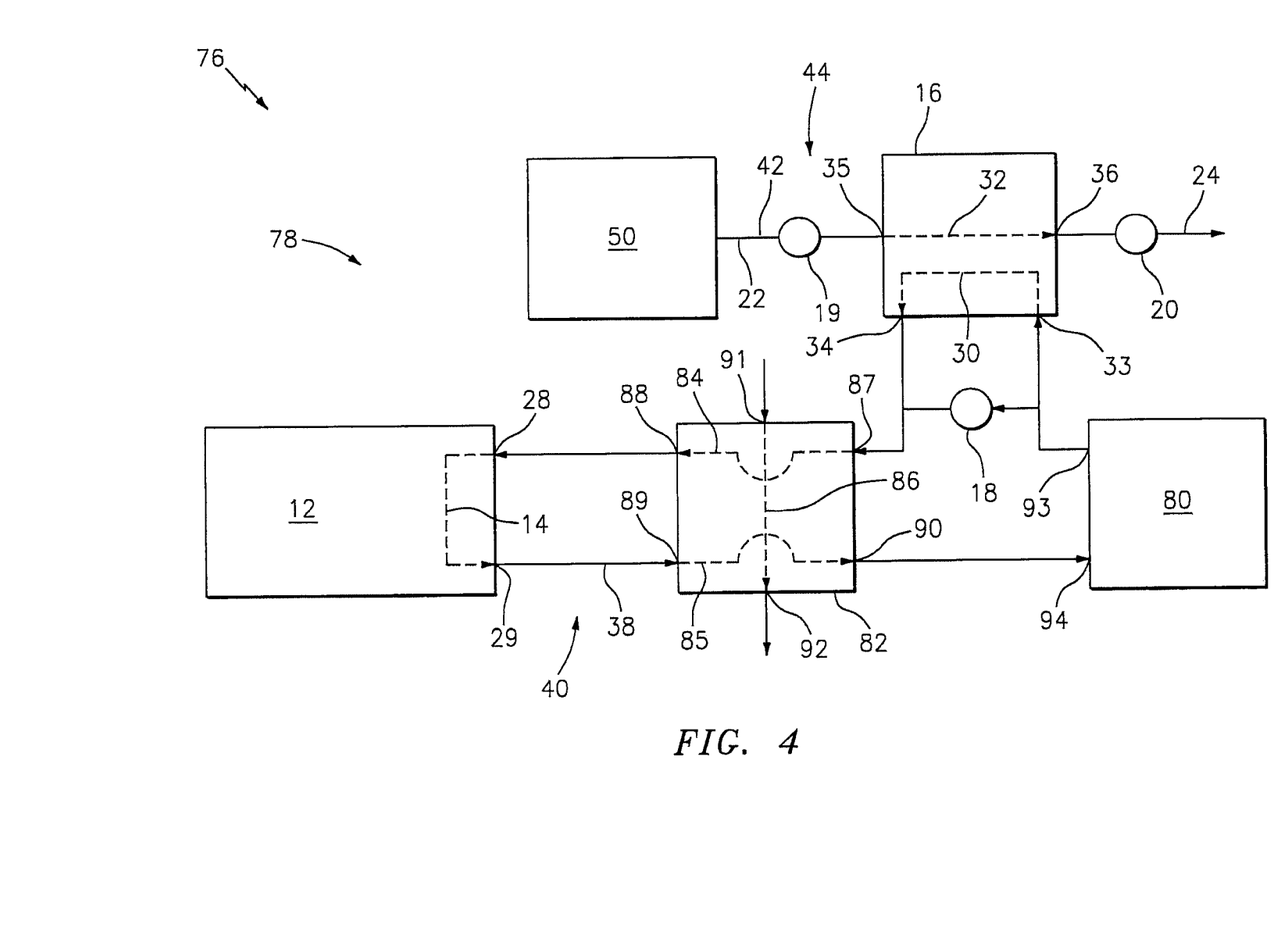
FIG. 4 is a schematic illustration of a turbine engine system that includes still another alternative embodiment cooling system for removing heat energy from a turbine engine heat source.

FIG. 4 is a schematic illustration of another turbine engine system 76 that includes another alternate embodiment cooling system 78, the turbine engine heat source 12, the cooling medium reservoir 50, and another cooling medium reservoir 80 (e.g., fuel or lubrication oil tank). In contrast to the cooling system 10 of FIG. 1, the cooling system 78 also includes a second heat exchanger 82.

The second heat exchanger 82 includes a plurality of heat exchange passages 84-86. The first passage 84 extends through the second heat exchanger 82 between a passage inlet 87 and a passage outlet 88. The second passage 85 extends through the second heat exchanger 82 between a passage inlet 89 and a passage outlet 90. The third passage 86 extends through the second heat exchanger 82 between a passage inlet 91 and a passage outlet 92, and is configured as part of another heat exchange system such as a fuel/lubrication oil cooler. Various types and configurations of fuel/lubrication oil coolers are known in the art, and therefore will not be discussed in further detail. The second heat exchanger 82 may be configured as a discrete unit. Alternatively, the second heat exchanger 82 may be included as part of one or more other components of the turbine engine.

The passages 30, 84, 14 and 85, the cooling medium reservoir 80, and the flow regulator 18 are configured in the closed loop circuit 38, and form the first heat exchange system 40. The passage 30 and the flow regulator 18 are arrange in parallel, and fluidly coupled inline between an outlet 93 of the cooling medium reservoir 80 and the passage inlet 87. The passage outlet 88 is fluidly coupled to the passage inlet 28. The passage outlet 29 is fluidly coupled to the passage inlet 89. The passage outlet 90 is fluidly coupled to an inlet 94 of the cooling medium reservoir 80.

To remove heat energy from the heat source 12, the first cooling medium circulates within the closed loop circuit 38. The heat energy from the heat source 12 is transferred into the first cooling medium flowing through the passage 14. The second heat exchanger 82 transfers the heat energy from the first cooling medium flowing through the passages 84 and 85 into another cooling medium flowing through the passage 86 and circulating within the cooler. In some modes of operation, the flow regulator 18 may cause the first cooling medium to bypass the heat exchanger 16. In other modes of operation, the flow regulator 18 may direct at least a portion of the first cooling medium through passage 30 in order to transfer additional heat energy from the first cooling medium into the second cooling medium as described above.

Figure 5:
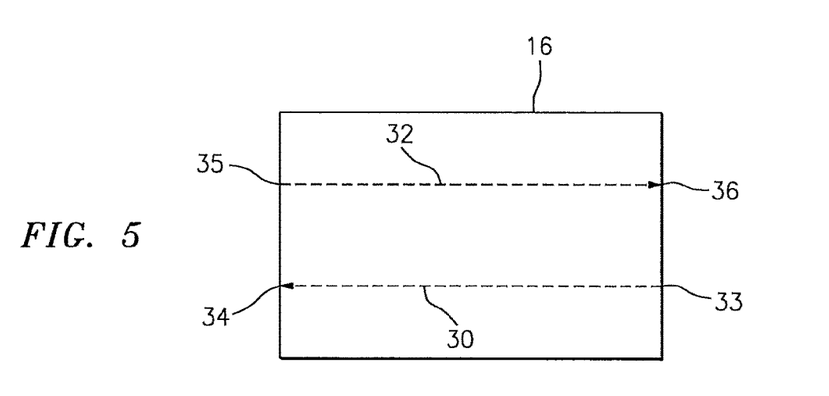
FIG. 5 is a schematic illustration of a counter flow heat exchanger.
Figure 6:
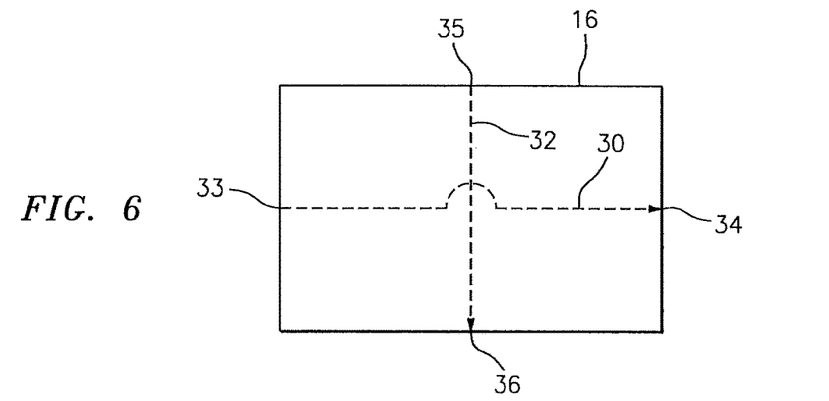
FIG. 6 is a schematic illustration of a cross flow heat exchanger.
Figure 7:
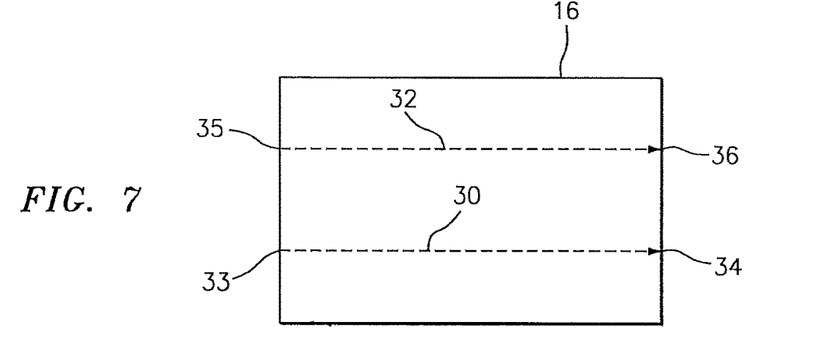
FIG. 7 is a schematic illustration of a parallel flow heat exchanger.
Figure 8:
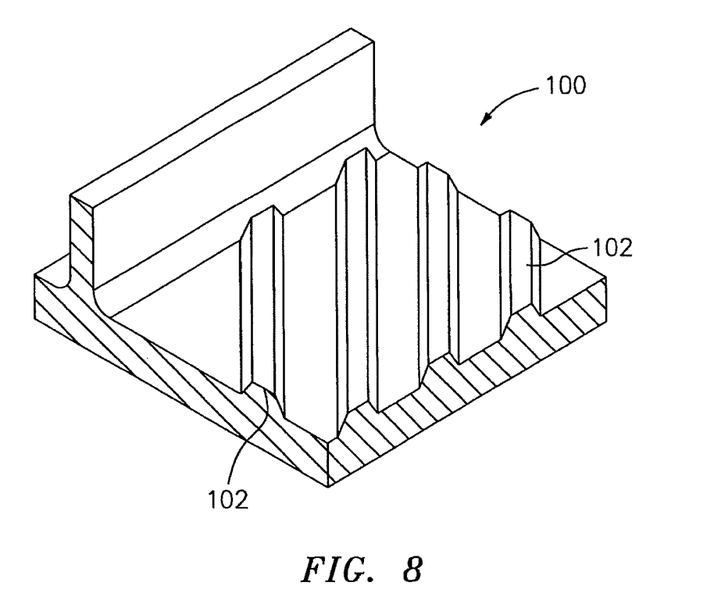
FIG. 8 is a perspective cutaway illustration of a heat exchange passage with a plurality of ribs.
Figure 9:
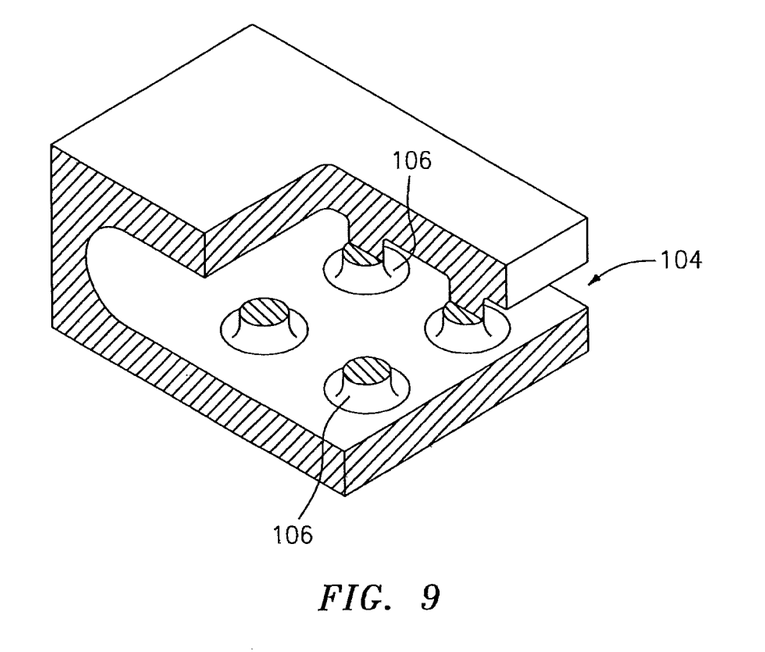
FIG. 9 is a perspective cutaway illustration of a heat exchange passage with a plurality of pedestals.
Figure 10:
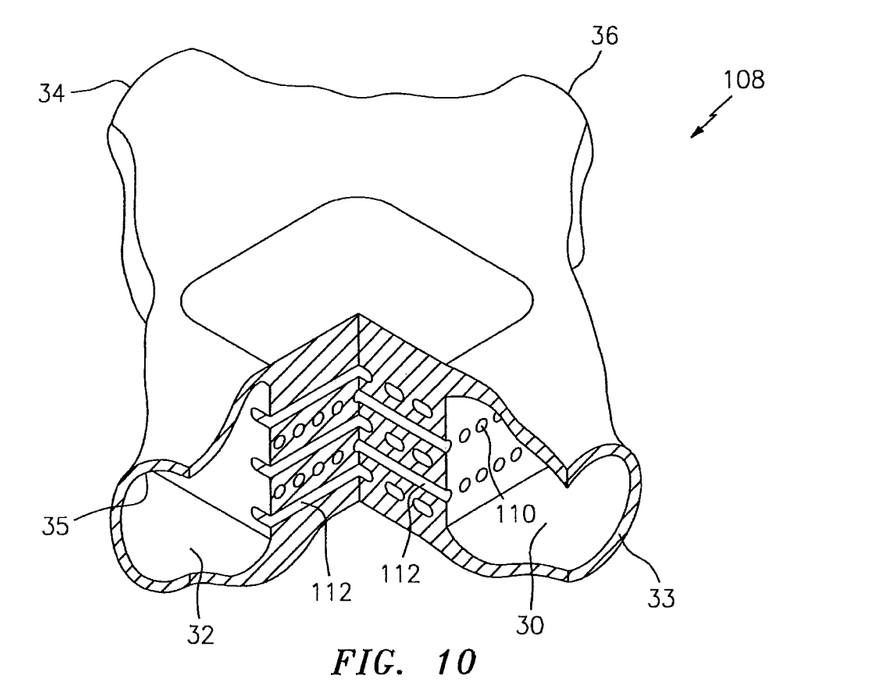
FIG. 10 is a perspective cutaway illustration of a cross flow heat exchanger.
Figure 11:
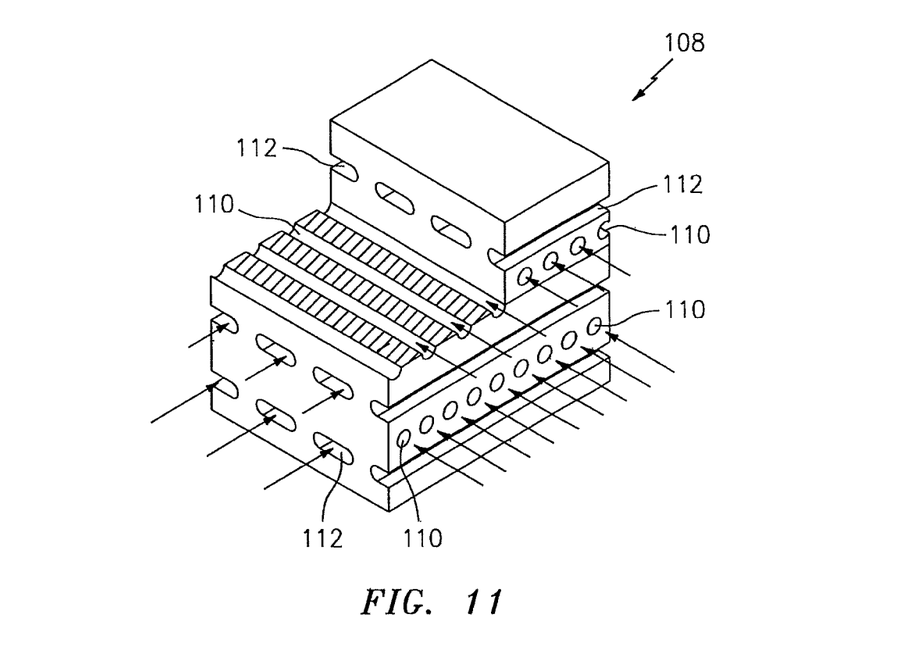
FIG. 11 is a perspective cutaway illustration of a core for the cross flow heat exchanger of FIG. 10.
Figure 12:
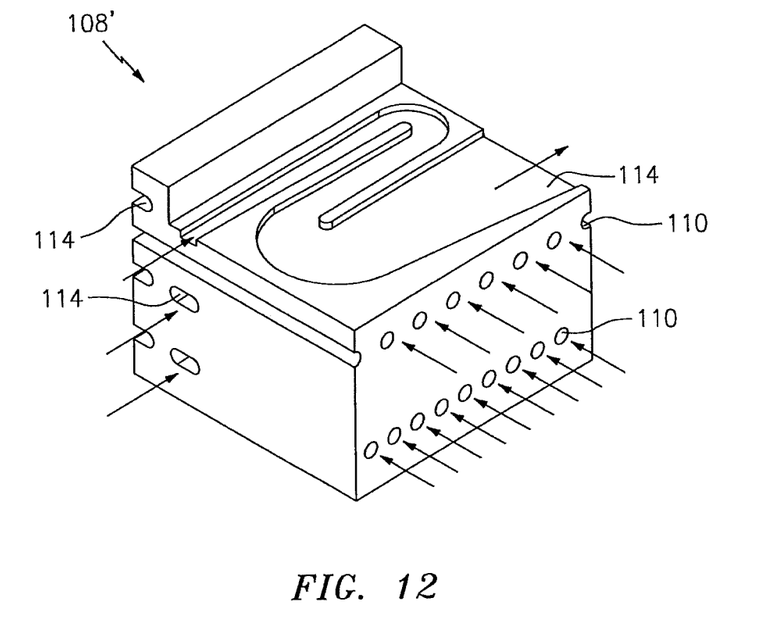
FIG. 12 is a perspective cutaway illustration of an alternative core embodiment for the cross flow heat exchanger of FIG. 10.

One or more of the heat exchangers 16, 54 and 82 may have various configurations other than those described above and illustrated in the drawings. The heat exchange passages 30 and 32, for example, may be arranged in a counter flow configuration as illustrated in FIG. 5. The heat exchange passages 30 and 32 may be arranged in a cross flow configuration as illustrated in FIG. 6. The heat exchange passages 30 and 32 may be arranged in a parallel flow configuration as illustrated in FIG. 7. One or more of the heat exchange passages may each include one or more heat transfer enhancement features such as ribs, pedestals and/or any other types of protrusions and/or recesses that increase surface area of the passage. For example, FIG. 8 illustrates a heat exchange passage 100 that includes a plurality of ribs 102. In another example, FIG. 9 illustrates a heat exchange passage 104 that includes a plurality of pedestals 106. One or more of the heat exchange passages may each include a plurality of sub-passages. In the heat exchanger 108 of FIGS. 10 and 11, for example, the second passage 30 includes a plurality of parallel and straight sub-passages 110. The third passage 32 includes a plurality of parallel and straight sub-passages 112. Alternatively, as illustrated in FIG. 12, the third passage 32 may include a plurality of parallel and tortuous sub-passages 114. The present invention therefore is not limited to any particular heat exchanger and/or heat exchange passage types and/or configurations.

One or more of the heat exchangers 16, 54 and 82 may be manufactured with a metal powder bed process. The metal powder bed process may utilize direct metal laser sintering (DMLS) and/or electron beam welding (EBM). The present invention, of course, is not limited to any particular heat exchanger manufacturing processes or techniques.

Figure 13:
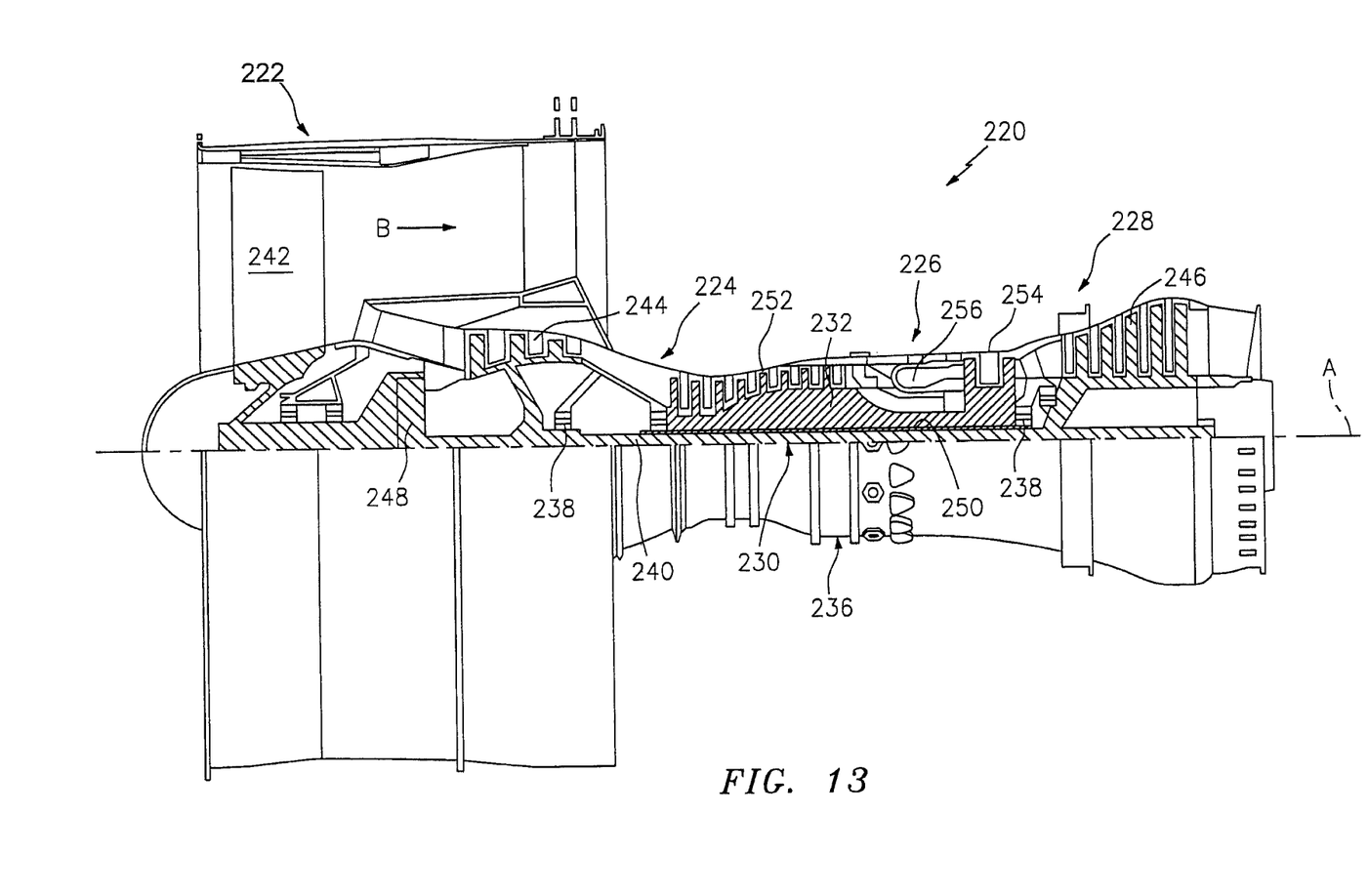
FIG. 13 is a partial sectional illustration of a turbine engine in which the heat source of FIGS. 1-4 may be included.

FIG. 13 is a partial sectional illustration of a geared turbine engine 220 in which the heat source 12 may be included. The turbine engine 220 is a two-spool turbofan that generally incorporates a fan section 222, a compressor section 224, a combustor section 226 and a turbine section 228. Alternative engines might include an augmentor section (not shown) among other systems or features. The fan section 222 drives air along a bypass flowpath while the compressor section 224 drives air along a core flowpath for compression and communication into the combustor section 226 then expansion through the turbine section 228. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 220 generally includes a low spool 230 and a high spool 232 mounted for rotation about an engine central longitudinal axis A relative to an engine static structure 236 via several bearing assemblies 238. The low spool 230 generally includes an inner shaft 240 (e.g., low speed shaft) that interconnects a fan 242, a low pressure compressor 244 ("LPC") and a low pressure turbine 246 ("LPT"). The inner shaft 240 drives the fan 242 directly or through a geared architecture 248 (e.g., gear train) to drive the fan 242 at a lower speed than the low spool 230. An exemplary reduction transmission is an epicyclic transmission, namely a planetary or star gear system.

The high spool 232 includes an outer shaft 250 (e.g., high speed shaft) that interconnects a high pressure compressor 252 ("HPC") and high pressure turbine 254 ("HPT"). A combustor 256 is arranged between the high pressure compressor 252 and the high pressure turbine 254. The inner shaft 240 and the outer shaft 250 are concentric and rotate about the engine central longitudinal axis A which is collinear with their longitudinal axes.

Core airflow is compressed by the low pressure compressor 244 then the high pressure compressor 252, mixed with the fuel and burned in the combustor 256, then expanded over the high pressure turbine 254 and low pressure turbine 246. The turbines 254, 246 rotationally drive the respective low spool 230 and high spool 232 in response to the expansion.

The main engine shafts 240, 250 are supported at a plurality of points by bearing assemblies 238 within the static structure 236. It should be understood that various bearing assemblies 238 at various locations may alternatively or additionally be provided.

In one non-limiting example, the gas turbine engine 220 is a high-bypass geared aircraft engine. In a further example, the gas turbine engine 220 bypass ratio is greater than about six (6:1). The geared architecture 248 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 230 at higher speeds which can increase the operational efficiency of the low pressure compressor 244 and low pressure turbine 246 and render increased pressure in a fewer number of stages.

A pressure ratio associated with the low pressure turbine 246 is the pressure measured prior to the inlet of the low pressure turbine 246 as related to the pressure at the outlet of the low pressure turbine 246 prior to an exhaust nozzle of the gas turbine engine 220. In one non-limiting embodiment, the bypass ratio of the gas turbine engine 220 is greater than about ten (10:1), the fan diameter is significantly larger than that of the low pressure compressor 244, and the low pressure turbine 246 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 222 of the gas turbine engine 220 is designed for a particular flight condition—typically cruise at about 0.8 Mach and about 35,000 feet. This flight condition, with the gas turbine engine 220 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 222 without the use of a Fan Exit Guide Vane system. The low Fan Pressure Ratio according to one non-limiting embodiment of the example gas turbine engine 220 is less than 1.45. Low Corrected Fan Tip Speed is the actual fan tip speed divided by an industry standard temperature correction of $"T"/518.7^{0.5}$ in which "T" represents the ambient temperature in degrees Rankine. The Low Corrected Fan Tip Speed according to one non-limiting embodiment of the example gas turbine engine 220 is less than about 1150 fps (351 m/s).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine system for a gas turbine engine, the system comprising:

a turbine engine heat source including a first passage;

a heat exchanger including a second passage and a third passage;

a cooling medium inlet;

a cooling medium outlet;

wherein the first and the second passages are configured in a closed loop circuit; and wherein the third passage is configured between the cooling medium inlet and the cooling medium outlet in an open loop circuit; and a second heat exchanger that includes a fourth passage, wherein the first passage is fluidly coupled between an outlet of the second passage and an inlet of the fourth passage, and the heat source includes a fifth passage that is fluidly coupled between an outlet of the fourth passage and an inlet of the second passage.

2. The system of claim 1, wherein the open loop circuit is configured discrete from a fuel system of the gas turbine engine.

3. The system of claim 1, further comprising a rotor and a shaft, wherein the heat source includes a gear train that connects the rotor to the shaft.

4. The system of claim 1, further comprising a cooling medium reservoir that is fluidly coupled to the cooling medium inlet and configured in the open loop circuit.

5. The system of claim 4, wherein the cooling medium reservoir contains a cooling medium that is supplied to the third passage through the cooling medium inlet, and wherein the cooling medium comprises water.

6. The system of claim 1, further comprising a flow regulator that is fluidly coupled between the cooling medium inlet and the third passage.

7. The system of claim 1, further comprising a flow regulator that is fluidly coupled between the third passage and the cooling medium outlet.

8. The system of claim 1, wherein at least portions of the second and the third passages are arranged in a counter flow configuration.

9. The system of claim 1, wherein at least portions of the second and the third passages are arranged in a cross flow configuration.

10. The system of claim 1, wherein at least portions of the second and the third passages are arranged in a parallel flow configuration.

11. The system of claim 1, further comprising a flow regulator that is fluidly coupled between the first and the second passages.

12. The system of claim 1, further comprising a cooling medium reservoir that is configured in the open loop circuit, wherein the cooling medium reservoir contains a cooling medium that is supplied to the third passage through the cooling medium inlet, and the cooling medium comprises refrigerant.

* * * * *

UNITED STATES PATENT AND TRADEMARK OFFICE
CERTIFICATE OF CORRECTION

PATENT NO. : 10,047,631 B2
APPLICATION NO. : 15/651194
DATED : August 14, 2018
INVENTOR(S) : Blair et al.

Page 1 of 1

It is certified that error appears in the above-identified patent and that said Letters Patent is hereby corrected as shown below:

In the Specification

Column 3, Line 59, please delete "&cued" and insert --formed--.

Column 4, Line 30, please delete "foim" and insert --form--.

Column 4, Line 41, please delete "peimit" and insert --permit--.

Signed and Sealed this
Fourth Day of June, 2019

Andrei Iancu
*Director of the United States Patent and Trademark Office*